United States Patent [19]

Mead

[11] 3,856,959

[45] Dec. 24, 1974

[54] INHIBITION OF LEUKEMIA UTILIZING 5-METHYLTETRAHYDROHOMOFOLATE

[75] Inventor: John A. R. Mead, Bethesda, Md.

[73] Assignee: The United States of America as represented by the Secretary of the Department of Health, Education and Welfare, Washington, D.C.

[22] Filed: July 24, 1972

[21] Appl. No.: 274,749

[52] U.S. Cl. .............................................. 424/251
[51] Int. Cl. .......................................... A61k 27/00
[58] Field of Search .................................... 424/251

[56] References Cited
OTHER PUBLICATIONS

Chemical Abstracts 60: 9277(h) (1964).
Chemical Abstracts 66: 72707w (1967).
Chemical Abstracts 71: 67261v (1969).

Primary Examiner—Jerome D. Goldberg

[57] ABSTRACT

A method of inhibiting methotrexate sensitive leukemia L1210 and methotrexate resistant leukemias derived from L1210, such as variants L1210/FR-8, L1210/M-46-R, L1210/C-95, and L1210/M-66-3A in mice. This method produces optimum results as to the resistant leukemias as well as significant activity as to the sensitive leukemia. The compound employed is 5-methyltetrahydrohomofolate utilized as an injectable in a dosage regiment of 12.5–1600 mg/kg/inj/diem. The mechanism of action prefers dosages for at least two to four days, and in mice optimum results are obtained when treatment is commenced on day 1 following leukemia innoculation and is continued to the death of mice.

3 Claims, No Drawings

INHIBITION OF LEUKEMIA UTILIZING 5-METHYLTETRAHYDROHOMOFOLATE

The present application contains subject matter related to Ser. No. 263,559, filed June 16, 1972, Knott et al., assigned also to U.S.A.-HEW, entitled "Synthesis of $N^5$-Methyltetrahydrohomofolic Acid and Related Reduced Derivatives of Homofolic Acid," which deals with the preparation of the present compound per se and is incorporated herewith by reference.

In precise form, the related Knott et al. application commences with homofolic acid (HFA) which is reduced with hydrogen and platinum oxide to tetrahydrohomofolate (THHF). This latter material is then reacted with formaldehyde to produce $N^5, N^{11}$-methylene THHF which is then reduced with sodium borohydride to produce the desired $N^5$-methyl THHF in the disodium salt form. The production of the related folate derivatives (i.e., $N^5$-methyltetrahydrofolate) has been described in the literature as follows:

W. Sakami, Biochem. Prep., 10, 103 (1963)
V. S. Gupta and F. M. Huennekens, Arch. Biochem. Biophys., 120, 712–718 (1967)

Additionally, in the patent art the production of tetrahydrohomofolic acid salts is described in:

U.S. Pat. No. 3,468,886 Mosher et al. (USA—HEW)
U.S. Pat. No. 3,637,695 Kim et al. (USA—HEW)

In modern leukemia therapy, the standard drug of comparison for several years has been methotrexate (amethopterin). The modus of action in vivo of this compound in enzymatic reaction is to inhibit the action of dihydrofolate reductase and this and similar drugs constituting 4-amino analogues of folic acid are known as the 4-amino-antifolates. It has recently been realized that where leukemia is strongly resistant to the 4-amino-antifolates and is characterized by high levels of dihydrofolate reductase, certain homofolate derivatives show a substantial antileukemic effect — J. A. R. Mead, Ann. N.Y. Acad. Sci., 186, 514–515, Nov., 1971.

It has been shown that tetrahydrohomofolate is a potent inhibitor in vitro in the enzymatic reaction of thymidylate synthetase and the enzyme is metabolically beyond or below the action of the dihydrofolate reductase. Thus, it is considered possible that dihydrohomofolate and possibly homofolate by conversion in vivo to a specific inhibitor of thymidylate synthesis might block the growth of amethopterin-resistant cells having high levels of dihydrofolate reductase — J. A. R. Mead et al., Cancer Research, 2374–2379 (1966).

In summation, whereas the known compounds utilized have been active at (2) in the accompanying Chart I, the tetrahydrohomofolates are active at (3), and it is believed in the present invention, the 5-methyltetrahydrohomofolate (5-MeTHHF) is active at (4) relative to the action of methionine synthetase.

CHART I
Enzymic Reactions of Folates

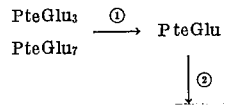

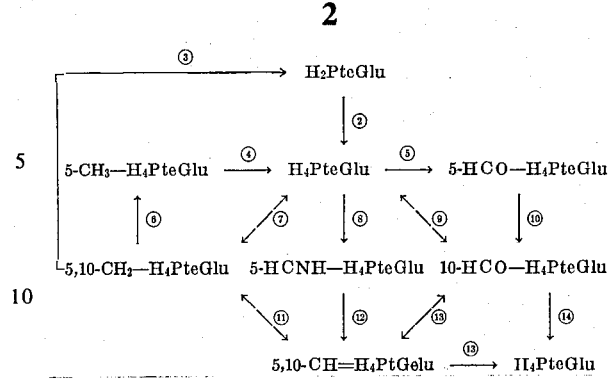

① Conjugase
② Dihydrofolate reductase
③ Thymidylate synthetase
④ Methionine synthetase
⑤ Formylglutamate formyl transferase
⑥ $N_5, N_{10}$-methylenetetrahydrofolate reductase
⑦ L-Serine hydroxymethyl transferase
⑧ Formiminoglutamate Formimino Transferase
⑨ $N_{10}$-formyltetrahydrofolate synthetase
⑩ $N_5$-formyltetrahydrofolate isomerase
⑪ $N_5, N_{10}$-methylenetetrahydrofolate dehydrogenase
⑫ $N_5$-formiminotetrahydrofolate cyclodeaminase
⑬ $N_5, N_{10}$-methenyltetrahydrofolate cyclohydrolase
⑭ 5-Amino-4-imidazole carboxamide ribonucleotide transformylase
⑮ Glycinamide ribonucleotide transformylase There is also considerable evidence that the presence of methyl at the $N^5$ position has retarded the chemical breakdown of $H_4$ to $H_2$ by oxidation and thus 5-methyl THHF is more stable than THHF. For purposes of the present specification and claims, this compound, 5-methyl THHF, by definition includes the free acid, mono and dialkali metal salts, and pharmaceutically acceptable acid addition salts for adjusting solubility. Thus, the present invention is directed towards the free acid as well as the mono and dipotassium salts, the mono and disodium salts, and analogous soluble salts of Group IA of the Periodic Table, such as lithium, rubidium, and caesium. Additionally, pharmaceutically acceptable acid addition salts and amine salts, such as those formed from a strong base such as cyclohexylamine, are also included in this definition.

Although not a required component of the injectable, due to the tendency of the tetrahydrohomofolates to oxidize, it is of auxiliary value to include a mild reducing agent which is pharmaceutically utilizable, such as sodium ascorbate, cysteine, mercaptoethanol, 1,2-mercaptopropanol, Clelands reagent, etc.

The usefulness of the reduced homofolate derivatives, especially in methotrexate-resistant variants of leukemia L1210, has been apparent for some time. One difficulty has been in that the tetrahydrohomofolate per se and its alkaline salts have been highly fugitive due to rapid oxidation which not only posed problems during its formation but in its use. The present derivative, $N^5$-methyltetrahydrohomofolate, shows greater stability and enables its use in animal (mice) therapy. Especially this compound or drug is an effective antileukemic agent against methotrexate-resistant L1210/FR-8 leukemia which contains high levels of dihydrofolate reductase. Additionally, the 5-methyl compound has been found active against other L1210 variants which are methotrexate resistant, such as L1210/M-46-R, L1210/C-95, and L1210/M-66-3A.

It is noted in the formula

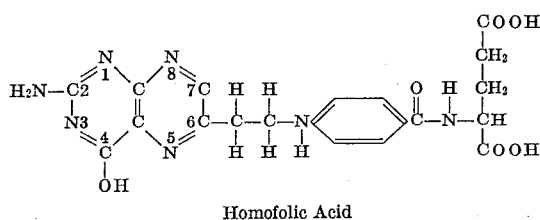

Homofolic Acid that carbon 6 is asymmetric and thus the synthetically produced compound is a racemate. It has been suggested that in the tetrahydro analog this dl,L tetrahydrohomofolate may undergo isomeric changes to the 1,L diastereoismer in vivo [L. C. Mishra et al., Biochem. Pharm., 2871–2878 (1971)].

In animal studies with mice where the $N^5$-methyltetrahydrohomofolic acid was compared with methotrexate (MTX) against L1210 sensitive and the L1210 resistant variants, the results showed that the 5-methyl compound was vastly superior to MTX in increasing life span and median survival time even at low dosages of 12.5 mg/kg as to the resistant tumor and a significantly active compound against the sensitive tumor. From these low dosages up to so-called optimum dosages of 400 mg/kg, the 5-methyl compound operated in an optimum manner where the IP treatment schedule was daily from day 1 until death.

In the accompanying Chart II, it was noted that the superiority of the 5-MeTHHF over methotrexate is not apparent utilizing the L1210 sensitive strain but that the 5-methyl would be operable.

Additionally, Chart III shows vividly as to the L1210/FR-8 the superiority in ILS and MST over methotrexate. In the comparison chart it is noted that the dosages for methotrexate are comparatively low due to the differential potency and toxicity of this drug.

Chart IV shows additional animal studies with mice using the disodium salt wherein an additional variant (namely, L1210/M-46-R) resistant to methotrexate was utilized. This study indicates that an increase in ILS of 75 percent resulted at the low dosage of 12.5 mg/kg/inj.

CHART II

Schedule Dependency Study of NSC-139490 with the L1210 Sensitive and the L1210 Variant Resistant to MTX (FR-8/R Tumor)

| Compound (NSC No.) Vehicle, Physical St., pH | IP Treatment Schedule | Dose (mg/kg/inj) | L1210 Sensitive Med. S.T. | % ILS | L1210 FR-8/R Med. S.T. | % ILS |
|---|---|---|---|---|---|---|
| 5-Methyltetra-hydrohomofolic (139490) | Day 1 until death | 800 | 13 | 44 | 13 | 44 |
| | | 400 | 15 | 67 | 16.5 | 83 |
| | | 200 | 14 | 55 | 20 | 122 |
| | | 100 | 12 | 33 | 21.5 | 139 |
| | | 50 | 13 | 44 | 26 | 189 |
| | Days 1–9 | 800 | 12 | 33 | 16 | 78 |
| | | 400 | 14 | 55 | 18 | 100 |
| | | 200 | 13.5 | 50 | 16.5 | 83 |
| | | 100 | 12 | 33 | 16 | 78 |
| | | 50 | 12 | 33 | 15.5 | 72 |
| | Days 1,5,9 | 1600 | 10 | 11 | 16 | 78 |
| | | 800 | 12 | 33 | 15 | 67 |
| | | 400 | 10 | 11 | 13 | 44 |
| | | 200 | 10.5 | 17 | 13 | 44 |
| | Days 1,5,9 Q3H | 200 | 13 | 44 | 18 | 100 |
| | | 100 | 13 | 44 | 15 | 67 |
| | | 50 | 12 | 33 | 15.5 | 72 |
| | | 25 | 12 | 33 | 14 | 55 |
| MTX (740) 2% $NaHCO_3$ soln. pH 8.5 | Days 1–9 | 3.0 | 15.5 | 72 | 9 | 0 |
| | | 1.5 | 13.5 | 50 | 9 | 0 |
| | | 0.75 | 12 | 33 | 9 | 0 |
| | | 0.375 | 12 | 33 | 9 | 0 |
| Untreated Controls | | | 9 | | 9 | |

Mice:
$CDF_1$, male, 19–26 gms, 9 weeks.
SC tumor
IP treatment as indicated

CHART III

Effect of 5-Methyltetrahydrohomofolate on Survival Time of Mice Bearing Methotrexate-sensitive (L1210) and -resistant (L1210-FR8) Leukemia

| Drug | Daily Dose mg/kg(ip)[a] | L1210 Median survival time(days) | L1210 Range of individual mortalities | %ILS | L1210-FR8 Median survival time(days) | L1210-FR8 Range of individual mortalities | %ILS |
|---|---|---|---|---|---|---|---|
| Vehicle Control | | 9 | 9–11 | 0 | 9 | 8–9 | 0 |
| Methotrexate NSC 740 | 3 | 17 | 13–23 | 88 | 8 | 8 | −12 |
| | 1.5 | 21 | 13–23 | 133 | 8 | 8 | −12 |
| | 0.75 | 16 | 14–20 | 77 | 8.5 | 8–9 | −5 |
| | 0.37 | 13 | 12–14 | 44 | 9 | 9–10 | 0 |
| 5-Methyltetrahydro-homofolate NSC 139,490 | 400 | 13 | 12–14 | 44 | 17 | 14–23 | 88 |
| | 200 | 14 | 13–15 | 55 | 17 | 14–23 | 88 |
| | 100 | 11 | 9–12 | 22 | 15 | 12–19 | 66 |
| Tetrahydrohomofolate NSC 89473 | 400 | 10 | 6–14 | 11 | 13 | 11–19 | 44 |
| | 200 | 12 | 10–12 | 33 | 12 | 10–12 | 33 |
| | 100 | 11 | 9–12 | 22 | 19 | 10–25 | 110 |

[a]Treatment was started on day 3 after tumor transplantation and continued daily until death. 8 mice were included in each group.

CHART IV

Effectiveness 5-Methyl H₄HF M-951 against L1210 FR-8 and M46-R variants resistant to MTX

| Agent (NSC No.) | Dose (mg/kg/inj) | L1210 FR-8 MST | % ILS | L1210 M-46-R MST | % ILS |
|---|---|---|---|---|---|
| 139490 5-Methyl H₄HF M-951 | 400 | 14 | 17 | 13 | 62 |
|  | 200 | 24 | 100 | 18 | 125 |
|  | 100 | 22 | 83 | 19 | 137 |
|  | 50 | 28.5 | 138 | 17 | 113 |
|  | 25 | 28.5 | 117 | 16 | 87 |
|  | 12.5 | 29.5 | 130 | 14 | 75 |
| 740 MTX M-9a | 3.0 | 9.5 | 0 | 10.5 | 31 |
|  | 1.5 | 11 | 0 | 10 | 25 |
|  | 0.75 | 10 | 0 | 9 | 13 |
|  | 0.375 | 12 | 0 | 8 | 0 |
| Untreated Controls |  | 12 |  | 8 |  |

MICE: CDF, male, 20-27 grams
10 mice/per group
Vehicles:
NSC-139490 in 0.6% ascorbic acid and 2% NaHCO₃ pH 7.0
NSC-740 in 2% NaHCO₃ solution, pH 8.5
SC tumor L1210 FR-8
SC tumor L1210 M-46-R
Treatment:
IP daily from day 1 until median day of death The embodiments of this invention in which an exclusive property or privilege is claimed are defined as follows:

1. A method of inhibiting L1210 leukemia in mice which consists of injecting in said mice an effective inhibition dosage of 5-methyltetrahydrohomofolate.

2. A method of treating murine leukemia selected from the group consisting of L1210 and methotrexate resistant variants thereof in mice which comprises injecting in said mice about 12.5–1,600 mg/kg/inj/day for at least 2 days with 5-methyltetrahydrohomofolate.

3. The method according to claim 2 which comprises treating methotrexate resistant variant of leukemias of L1210.

* * * * *

UNITED STATES PATENT OFFICE
CERTIFICATE OF CORRECTION

PATENT NO. : 3,856,959
DATED : December 24, 1974
INVENTOR(S) : John A. R. Mead, Roger L. Knott, and Alison Taunton-Rigby It is certified that error appears in the above-identified patent and that said Letters Patent are hereby corrected as shown below:

At page 1, under Inventors, in addition to John A. R. Mead, insert --Roger L. Knott and Alison Taunton-Rigby--. This correction is consonant with Patent Office Paper No. 9.

Signed and sealed this 13th day of May 1975.

(SEAL)
Attest:

RUTH C. MASON
Attesting Officer

C. MARSHALL DANN
Commissioner of Patents
and Trademarks